Dec. 17, 1968   J. POMAGALSKI   3,416,462
DEVICE FOR COUPLING LOADS SUSPENDED FROM A CABLE
Filed Aug. 9, 1966   6 Sheets-Sheet 1

Inventor
Jean Pomagalski
Slesinger, Arkwright & Garvey
ATTORNEYS

Dec. 17, 1968    J. POMAGALSKI    3,416,462
DEVICE FOR COUPLING LOADS SUSPENDED FROM A CABLE
Filed Aug. 9, 1966    6 Sheets-Sheet 2
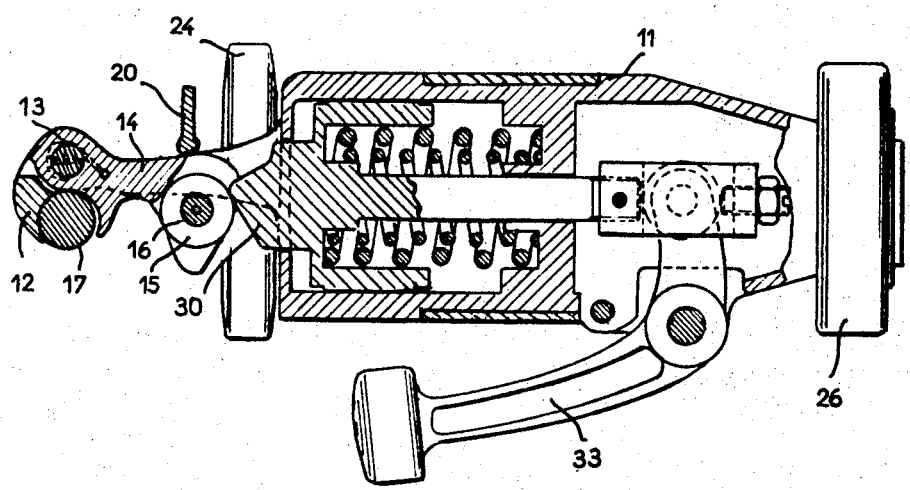
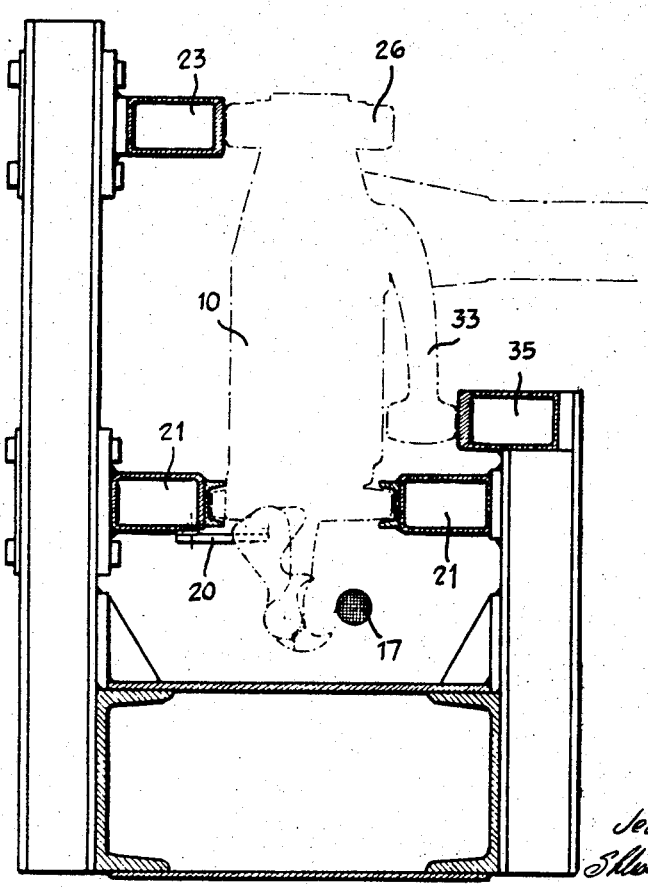
INVENTOR
Jean Pomagalski
ATTORNEYS

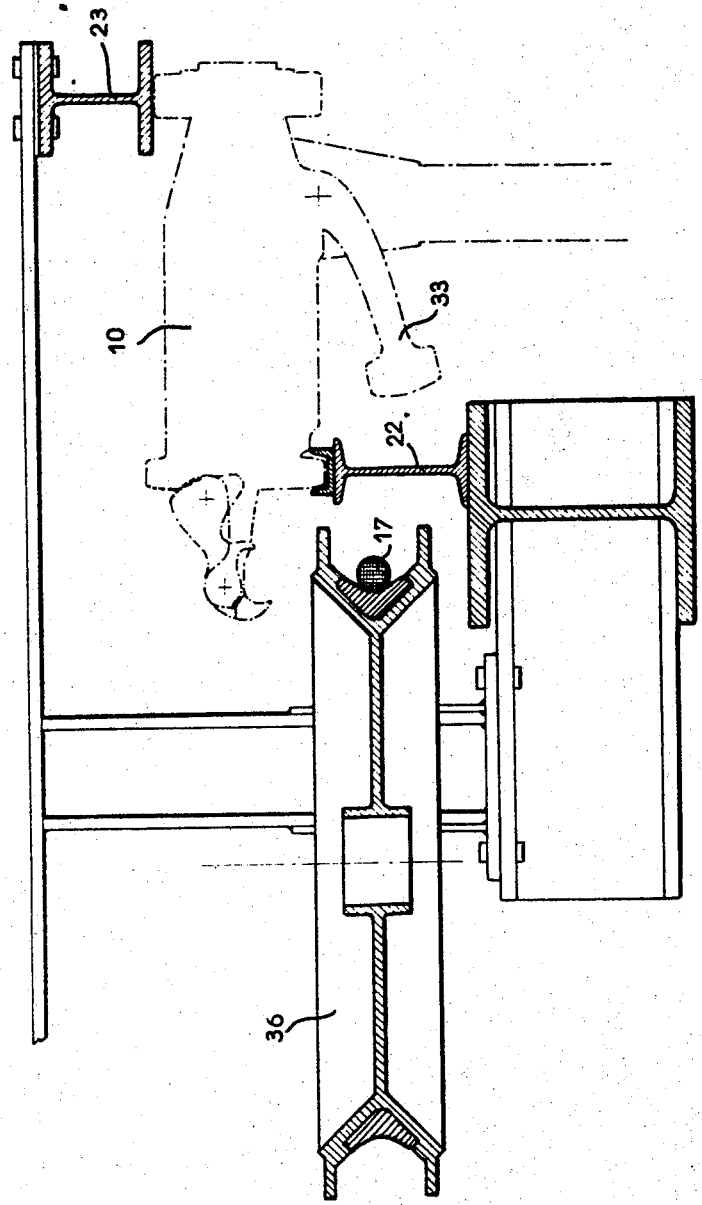

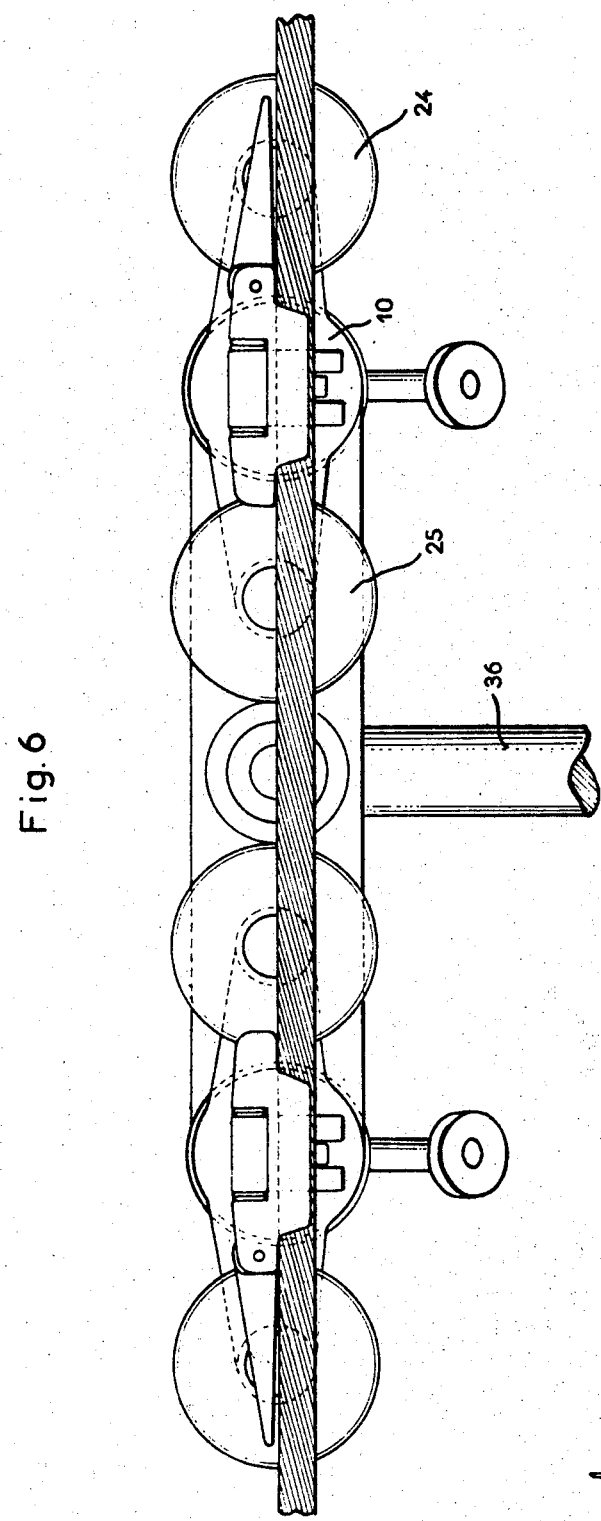

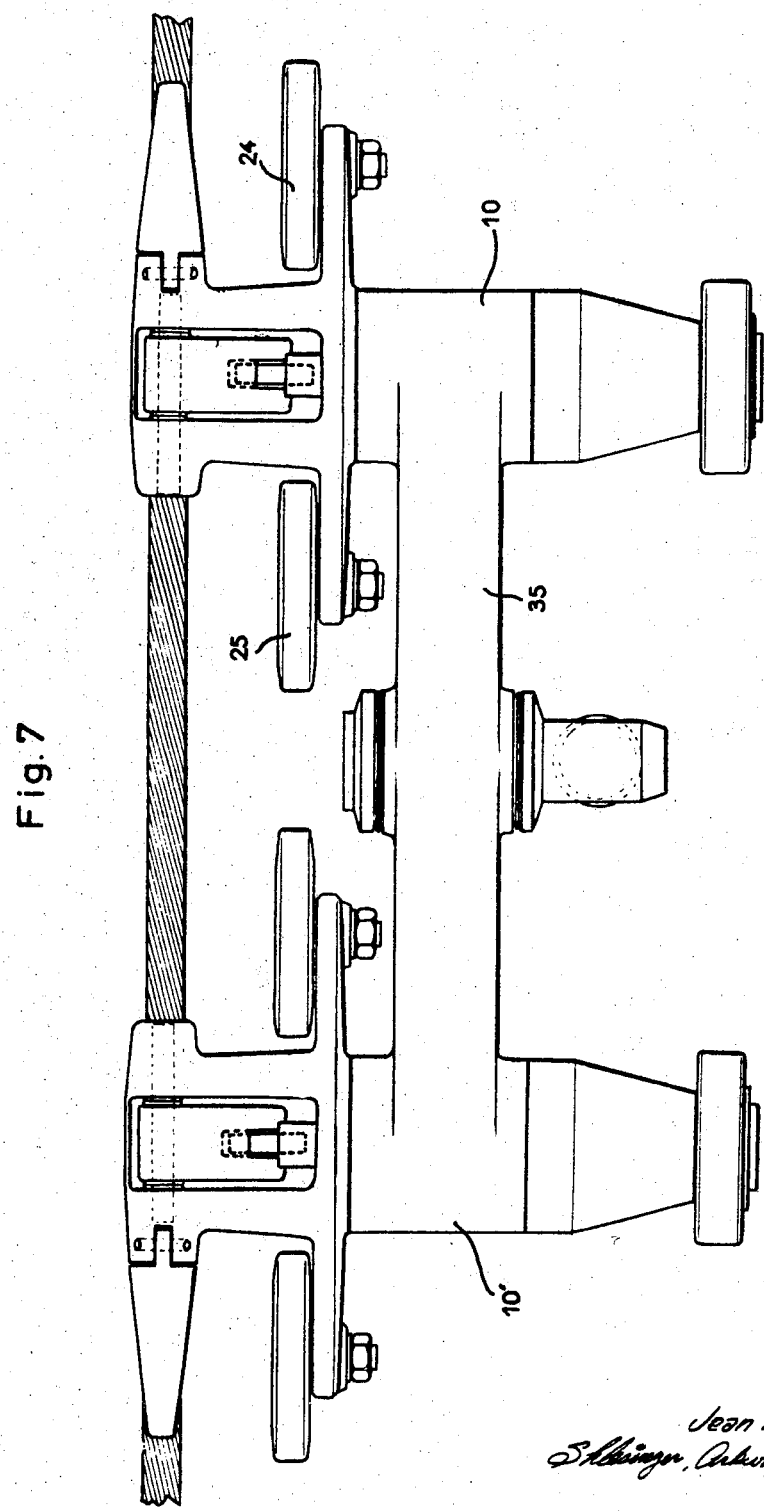

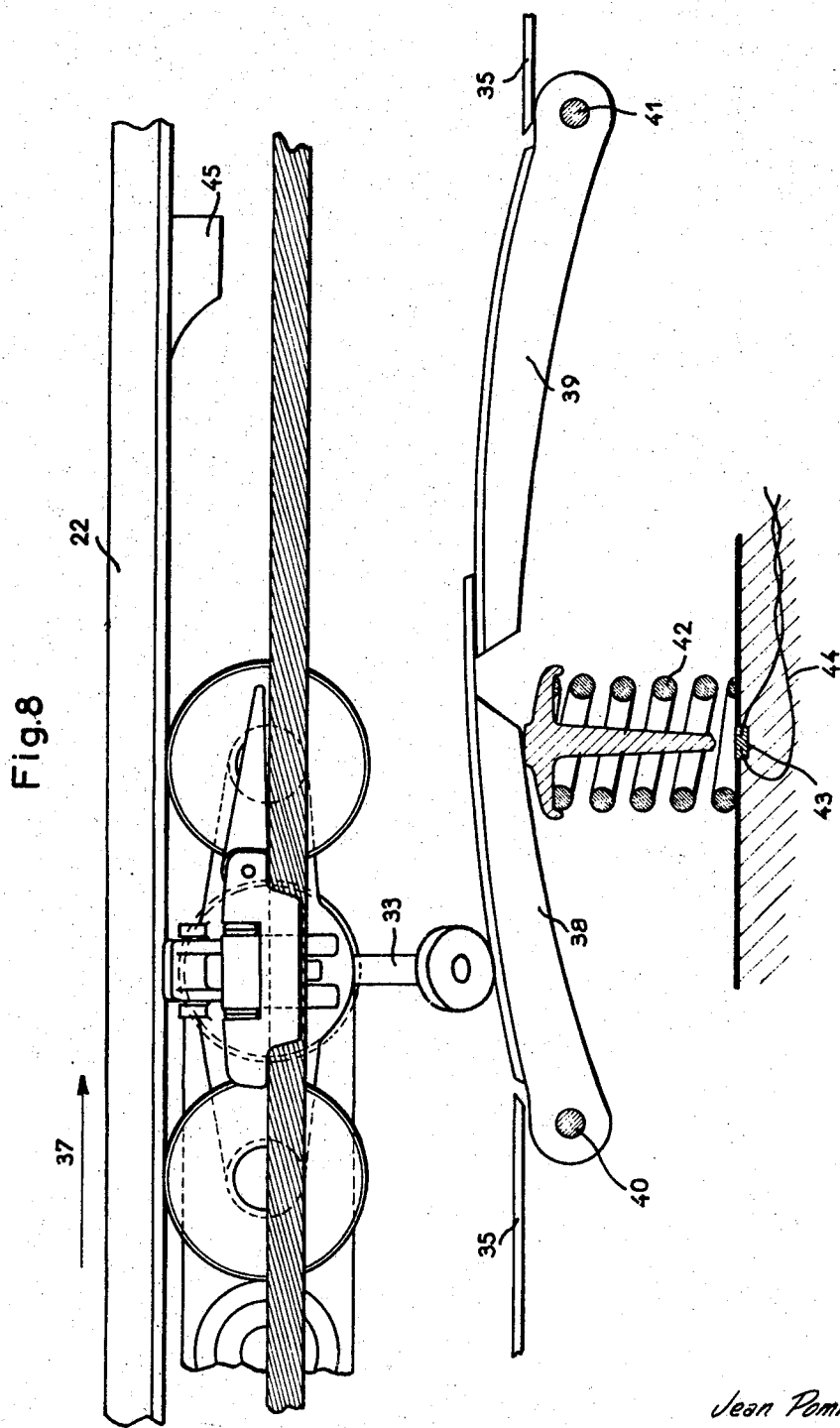

United States Patent Office 3,416,462
Patented Dec. 17, 1968

3,416,462
DEVICE FOR COUPLING LOADS SUSPENDED FROM A CABLE
Jean Pomagalski, 114 Chemin de l'Eygala,
Corenc-Montfleury, Isere, France
Filed Aug. 9, 1966, Ser. No. 571,329
Claims priority, application France, Aug. 12, 1965,
28,377
3 Claims. (Cl. 104—202)

ABSTRACT OF THE DISCLOSURE

This disclosure concerns a device for coupling to a movable cable loads that are to be suspended and transported by the cable having: a body provided with rolling means; at least one clamp for receiving and clasping the cable and including a fixed portion carried by the body and a movable portion pivoted on the fixed portion, a spring on the clamp urging the movable portion angularly away from the fixed portion so as to open the clamp to a diameter substantially greater than the diameter of the cable; a first fixed device for guiding and controlling including support means for the rolling means of the body, guide means cooperating with the support means for ensuring a translational movement to the body in accordance with a determined trajectory, and control means acting upon the movable portion of the clamp in the closing direction when the body is supported and maintained by the support and the guide means; a clasping device for the clamp including a piston housed in the body and spring-biased against the body, the piston having a cam; the clasping device being actuated toward the clasping position by second control means pivoted on the body and extending to the outside of the body, the cam acting on the movable portion of the clamp in the closing direction in a response to the movement of the second control means; a second fixed device disposed in spatial relationship to the first fixed device for guiding and controlling so that the second fixed device will act upon the second control means when the first control means have caused closing of the clamp.

---

The invention relates to cable transport installations in which a load, e.g., a cabin is attached to a cable, from which it can be detached. More specifically, the invention concerns devices in the form of a jaw clamp which operates automatically.

In order to be attached correctly to the cable, it is advisable to obtain maximum opening of the jaw clamp. In presently known apparatus, this opening can not be obtained except by a lengthy movement of the gripping member.

It is likewise advisable to be able to grip the cable with an almost constant force, regardless of the variations in diameter of the cable.

It is likewise desirable that the grip on the cable be systematically verified at each departure; a non-systematic verification being insufficient and hence dangerous.

An object of the present invention is first of all to obtain maximum opening of the jaw which is capable of attaining 180 degrees.

To reach this objective, the invention includes a jaw normally opened by the action of a spring and which is closed in two stages, the first stage under the action of a guide which is extrinsic to the coupling device itself, the second stage under the action of the intrinsic gripping device of the jaw clamp upon the cable.

Another object of the present invention is to obtain a gripping, the intensity of which is proportionate to the clamping diameter. To satisfy this objective, the invention provides a control device for tightening the clamp including a cam surface which acts obliquely upon the driven member, the obliqueness being such that the arm of the lever increases as the action of the spring decreases as a result of the stretching of the spring.

Another objective of the invention is to obtain a device that verifies automatically, hence systematically, the condition of grip making it possible to ensure the required elasticity.

To meet this objective, the invention provides a comparison device which compares the tension of the clamping spring with the tension of a standard or reference spring. This comparison device controls the unlocking of a device which is normally locked. This locks the access of the load to the station where there are installed the devices designated to effect the attachment of the load to the cable.

The following is an example of the invention without limiting the generic scope of the invention to or by the details of the example chosen as an illustration.

Figure 1:
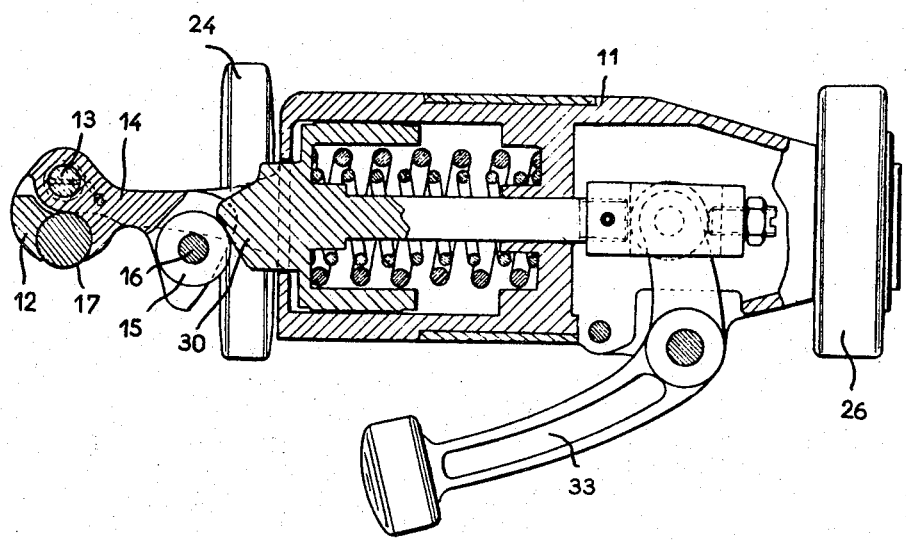
Figure 2:
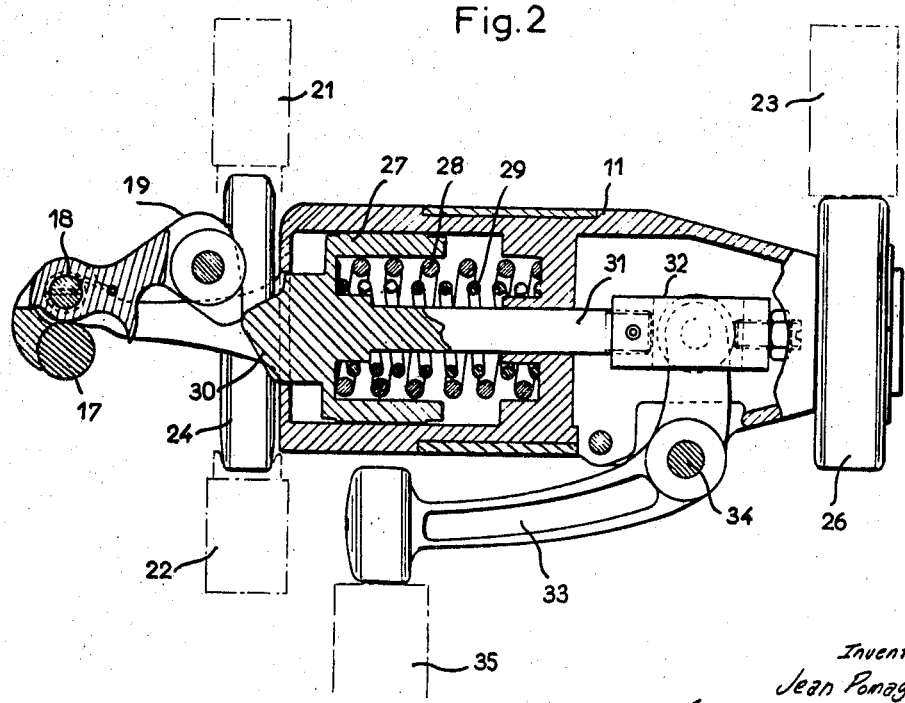

In the attached drawings:
FIGURES 1, 2 and 3 show cross-sectional views of a clamp and its control device in clamping, unclamping and intermediate positions, respectively;
FIGURES 4 and 5 show the device of the preceding figures with various guides and extrinsic controls to which it is subjected at a station;
FIGURE 6 is an elevation of a carriage with two clamps, the load being transported between the two clamps;
FIGURE 7 is a plan view of FIGURE 6;
FIGURE 8 is a schematic illustration viewed in elevation of the front of the carriage in FIGURE 6 at the moment when it contacts the comparator device.

In FIGURES 1, 2, 3 a device according to the invention which is indicated generally by 10 in FIGURES 4 to 7 shows the clamp and its control device together.

This device comprises an element 11 carrying a fixed part 12 of the clamp and on which is articulated at 13 a movable member 14 of the clamp. The part 14 carries a friction roller 15 revolving around an axis 16. A cable is indicated at 17.

A special spring 18, mounted on axis 13 tends to keep the clamp open in the position of FIGURE 2.

In order to pass from the position of FIGURE 2 to the position of FIGURE 3, the movable part 14 through a portion 19 is subjected to the action of a fixed guide 20 shown only in FIGURES 3 and 4 and which only exists at the stations, starting at the point where one should begin the operation of hitching the cabin and up to the point where the clamp will be in the position shown in FIGURE 3.

At the stations from the time before the unhitching and up to after re-hitching, the support of the load and its maintenance are ensured by the guides 21, 22 and 23 which control the friction rollers; guides 21, 22 control friction rollers 24, 25; and guide 23 controls friction roller 26 to maintain the whole device 10 horizontally. These three friction rollers are all visible in FIGURES 6 and 7.

Passage from the intermediary position of FIGURE 3 to the position of tightening in FIGURE 1 is effected by a control device comprising a piston 27 lodged in a cylinder contained in the element 11 and this piston is subjected to the action of a spring, or better, by way of security, subjected to the action of a pair of two springs 28 and 29. A cam 30 is an integral part of this piston 27. The springs may be contracted because a rod 31 of the piston, through the medium of a head 32, is subjected to the action of a curved lever 33 which pivots around the axis 34. This lever is subjected to the action of a guide 35, which is present at the stations, as soon as the support of the load is assured by the guides 21, 22 and 23. Unhitching can take place up to the point where the operation of re-hitching the load to the cable is begun through the action of the guide 20. The tightening is taken over by the cam 30.

In general, two combinations 10 and 10' will be used, one of which has just been described, (see FIGURES 6 and 7) joined by a beam 35' thus forming a carriage, the load being borne by the middle of the beam between the two series of friction rollers. The support which carries, for example, a cabin, is shown as 36.

FIGURE 4 shows a unit 10 with the various guides that cooperate with it at a station. The position shown is one in which the guide 35 having just acted upon the lever 33, the cam 30 has withdrawn and the clamp has opened under the action of the spring 18.

The guide 20 is shown in this figure although in fact it may be present only at the time of re-hitching and not at the time of unhitching, contrary to what is shown.

FIGURE 5 shows the moment when passengers embark from the cabin. Cable 17 has been lowered to its lowest point by a guide pulley 36.

FIGURE 8 shows the comparator device which is located before the point of re-hitching. The movement occurs in the direction of arrow 37 and the front of the carriage is thus shown, as well as the guide 22. Lever 33 and guide 35 are shown and have inserted therein a measuring bridge consisting of two rails 38, 39 articulated at 40, 41 and curved so as to be able to act, in passing, on the lever 33. A standard or reference spring 42 resists the reaction of springs 28, 29 thus permitting the comparison.

The spring 42 is calibrated so as to yield if the springs 28, 29 are in good condition and to close a circuit 44 of a switch 43. In this circuit is a controlling electro-magnet, (not shown) of the yieldable buffer 45 which, normally, prevents the passage of the carriage. A time-switch (not shown), inserted into the circuit 44 keeps this circuit closed during the time needed for the carriage to pass before the buffer 45, when the buffer is in a yielding position.

It should be noted that this comparator device can be used whenever the tightening of a clamp is effected by springs.

While the invention has been described in connection with different embodiments thereof, it will be understood that it is capable of further modification, and this application is intended to cover any variations, uses, or adaptations of the invention following, in general, the principles of the invention, and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. A device for the coupling to a movable cable of a given diameter of loads that are to be suspended and transported by the said cable comprising:
    (a) a body having thereon rolling means;
    (b) at least one jaw for clasping said cable along the major part of the diameter of said cable including a fixed portion carried by said body and a movable portion pivoted on said fixed portion, a spring on said jaw urging said movable portion angularly away from said fixed portion so as to open said jaw to a diameter substantially greater than said diameter of said cable;
    (c) a first fixed device for guiding and controlling said device including support means for said rolling means, guide means cooperating with said support means for ensuring a translational movement to said body in accordance with a determined trajectory, and control means acting upon the said movable portion of the jaw in the closing direction when said body is supported and maintained by the said support and guide means;
    (d) a clasping device for said jaw including a piston housed in said body and spring-biased against said body said piston having a cam; said clasping device being actuated toward the clasping position by second control means articulated to the said body and extending to the exterior of the said body, said cam acting on said movable portion of said jaw in the closing direction in response to a movement of the said second control means;
    (e) a second fixed device disposed in spatial relationship to said first fixed device for guiding and controlling so that said second fixed device will act upon the said second control means when said first control means has caused the closing of the said jaw.

2. Device according to claim 1, including means for comparing the pressure on said piston, said means comprising a calibrated spring mounted in opposition to said piston and yieldable thereto upon proper operation of said piston.

3. Device according to claim 2, including stop means in the form of a yieldable buffer element actuated by said calibrated spring when said calibrated spring yields to said piston.

References Cited
UNITED STATES PATENTS

| | | | |
|---|---|---|---|
| 437,110 | 9/1890 | Guerra | 104—204 |
| 3,089,433 | 5/1963 | Carlevaro | 104—204 |
| 3,257,966 | 6/1966 | Nixon | 104—205 |

ARTHUR L. LA POINT, *Primary Examiner.*

D. F. WORTH, *Assistant Examiner.*

U.S. Cl. X.R.

104—204, 210